1,872,927

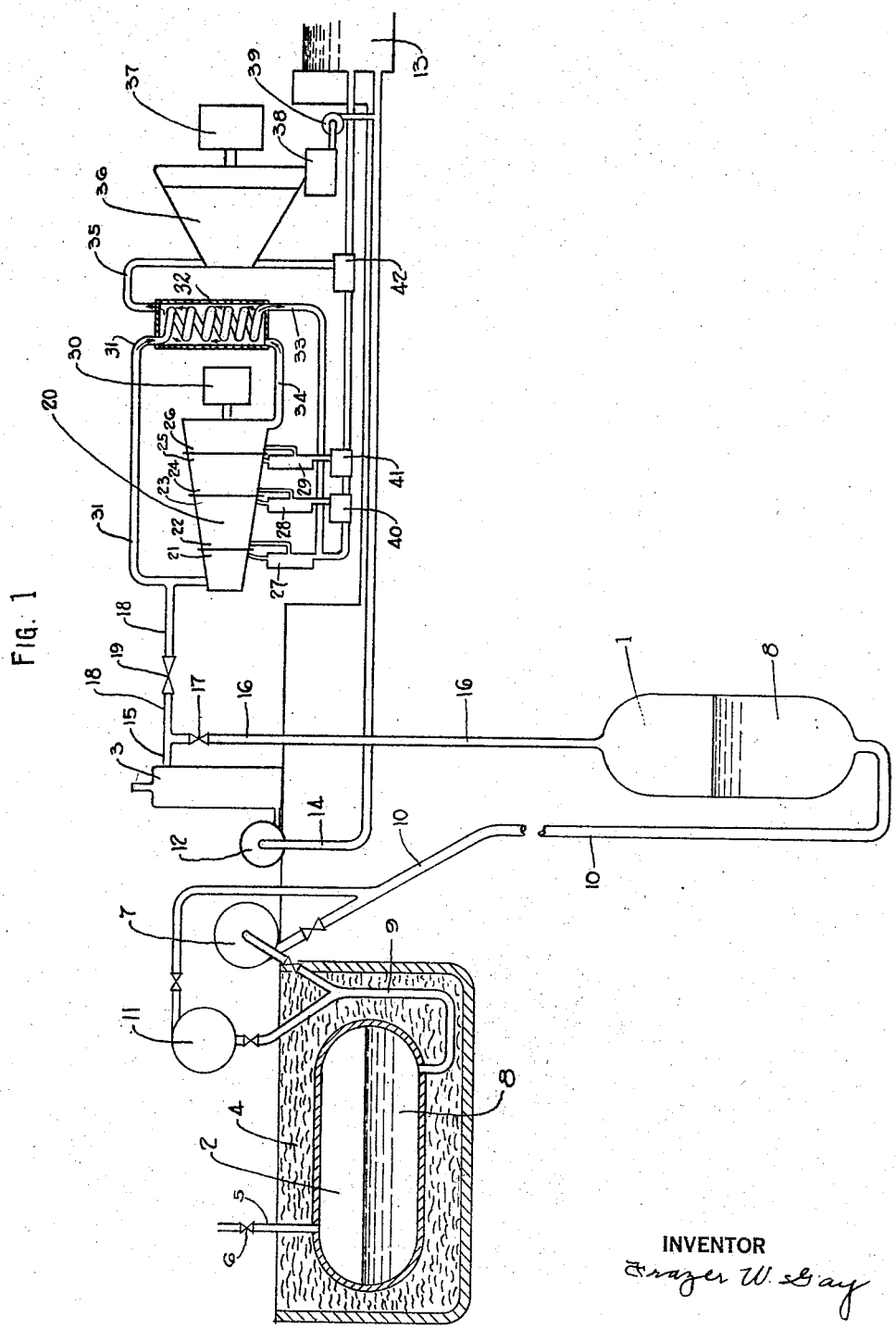
Aug. 23, 1932.  F. W. GAY  1,872,927
PEAK LOAD GENERATING STATION
Filed April 23, 1930
INVENTOR
Frazer W. Gay Patented Aug. 23, 1932

UNITED STATES PATENT OFFICE

FRAZER W. GAY, OF NEWARK, NEW JERSEY

PEAK LOAD GENERATING STATION

Application filed April 23, 1930. Serial No. 446,489.

This invention relates to a novel method of generating power for supplying peak loads.

It has been the practice of power companies in the past few years in building new power plants to install large turbo-generators having very high economy and adapted to run continuously for weeks or months at a time at substantially full load, while older plants were assigned to carry loads of shorter duration and very old plants were assigned to carry the peak loads.

The economy of power plants has now become so good that the coal cost per kilowatt hour is relatively low with respect to fixed charges per kilowatt hour. It is therefore no longer possible to justify the construction of a new power plant which will only serve to reduce the load factor on very efficient plants already operating, if it is possible to take care of increased capacity by building stations at a low cost adapted to carry the peak load.

It is an object of this invention to provide a novel steam storage plant adapted to carry peak loads. I am aware that steam storage plants have already been built, adapted to carry peak loads based on the principle of the "Ruths" accumulator. This accumulator consists of a tank, adapted to withstand high internal pressure. This tank is partially filled with water and then charged with steam, until the temperature of the water and the pressure within the tank are at the maximum value that the tank is adapted to withstand. At times of peak load, steam is drawn from the accumulator for the operation of a steam turbine and the temperature and pressure within the tank fall, until the pressure is so low that it is uneconomical to attempt to further handle the large volume of steam required to carry any considerable power output. The disadvantages of this scheme are obvious and are well understood as follows:

1st. Turbines are adapted to operate most economically at constant pressure. It is obvious that a turbine operating with steam from a Ruths' accumulator must operate first, with small volumes of steam at high pressure and finally with large volumes of steam at low pressure.

2nd. Only a relatively small percentage of the water initially in the accumulator is flashed into steam, and when the accumulator is shut down, the major part of the water remains in the accumulator and its temperature has generally fallen not more than one half the distance between the maximum temperature in the accumulator and the temperature in the condenser. In other words, generally less than half the total energy stored in the accumulator is economically available for peak load use.

It is an object of my invention to make substantially all the energy stored in the accumulator available to carry peak loads.

It is a further object of my invention to so construct my novel accumulator that it stores a very large amount of energy per cubic foot.

It is a further object of my invention to substantially completely displace the fluid in which the energy is stored by a heavier fluid always maintained at the temperature of the storage reservoir and preferably having a relatively low vapor pressure at the temperature of the storage reservoir.

It is a principle object of my invention to supply this large amount of stored energy to the turbine at constant temperature and pressure whereby the turbine may operate under the most economical conditions and those for which it was specifically designed. With accumulators heretofore used the pressure and temperature in the accumulator have fallen considerably from their maximum value and it is therefore necessary to operate the turbine at relatively low pressure at the time of peak load.

It is an object of my invention to use very high pressure and in the preferred form to extract moisture from the steam in its high pressure stages so as to avoid initial superheat, and to superheat in the low pressure stages with dry saturated high pressure steam.

It is a further object of my invention to utilize the high pressure condensate from the surface reheater, as well as the moisture extracted from the steam between the high pressure stages in such a manner as to allow it to give up its heat energy in succession to lower pressure stages by passing it in succession through boilers connected to said lower pressure stages, so that steam flashes off the water in each such lower stage and the water drains into the cold well at very little above the condenser sump temperature. It will be evident to one skilled in the art, that it is necessary for me, in order to displace the active energy carrying fluid in the accumulator, to pump my constant temperature less volatile fluid into the accumulator during times of peak load.

It is a further object of my invention to recover a large part of this energy during the reservoir storage period, by passing this constant temperature less volatile fluid through a Pelton water wheel or other fluid motor and using the energy so developed to supply power to the boiler feed water pump and the boiler draft motors, etc.

The invention is clearly illustrated in the accompanying drawing.

Fig. 1 shows an elevation partly in cross section of my novel peak load power station. 1 represents a huge underground tank adapted to store steam or other gas at very high temperature or pressure, or both. Tank 1 is adapted to store steam, supplied by boiler 3. 2 is a low pressure reservoir, adapted to store the constant temperature less volatile displacing fluid. In this case I have shown a fluid phenanthrene, having a vapor pressure of approximately 10 lbs. per sq. in. at the temperature used, in this case the critical temperature of water, namely 706 degrees Fahrenheit. Tank 2 is made of steel, and mounted with one end fixed and the other end movable, similar to all such accumulators. It is shown located in a pit or well and thoroughly bedded down in heat insulating material 4. A scavenging pipe 5 and valve 6 are supplied to clear the tank of noncondensable gases. A multi-stage high pressure pump 7 is adapted to pump the less volatile, constant temperature, displacing fluid 8, from tank 2 by way of pipe 9 and pipe 10 into storage accumulator 1, during times of peak load and a Pelton water wheel 11 is adapted to absorb the energy of the displacing liquid 8 when it is driven by steam (coming from boiler 3) over into the low pressure reservoir 2. A boiler 3 shown of the Benson type, receives its feed water from pump 12. Pump 12 takes cold water from cold storage reservoir 13 by way of pipe 14. Boiler 3, during off peak hours, supplies substantially all its steam to storage reservoir 1 through pipe 15, valve 17, and pipe 16. At times of peak load, boiler 3 supplies substantially all its steam by way of pipe 18 and valve 19 to high pressure turbine 20. Additional steam demanded by turbine 20 is drawn from reservoir 1 through pipe 16, valve 17, pipe 18, and valve 19. Pump 7 is operated as fast as may be necessary to maintain a constant steam pressure of approximately 3,200 lbs. per sq. in. in storage chamber 1. At three stages in high pressure turbine 20 stops are placed, and the steam is forced to pass to the next stages, namely 22, 24 and 26, through moisture extractors 27, 28, and 29. Turbine 20 drives generator 30. High pressure steam is carried by way of pipe 31 to an ordinary surface re-heater 32. The high pressure condensate is led from surface re-heater 32 by way of pipe 33 to the bottom of first stage water separator 27. In this water separator some of the condensate from re-heater 32 flashes into steam and reduces the temperature of the balance of the condensate to substantially the temperature of the dry saturated steam entering stage 22. Pipe 34 leads exhaust steam from turbine 20 to re-heater 32 and pipe 35 takes low pressure superheated steam from re-heater 32 to low pressure condensing turbine 36. Turbine 36 drives generator 37 and exhausts into condenser 38. Pump 39 pumps the condensate from condenser 38 into cold storage reservoir 13. The drain from water separator 27 passes to flash boiler 40. In flash boiler 40 the pressure is reduced and part of the water leaving moisture separator 27 flashes into steam. The water in boiler 40 has its temperature lowered to substantially that of the dry saturated steam entering stage 24. Additional water reaches boiler 41 from separator 29. Water from boiler 41 is valved into boiler 42 and flashes into steam entering turbine 36, in this case shown as receiving steam at substantially atmospheric pressure. The warm water is valved out of boiler 42 into cold well 13.

As many changes could be made in the above construction and many apparently widely different embodiments of this invention could be made thereof, it is intended that all matter contained in the above description or shown in the accompanying drawings shall be interpreted as illustrative and not in a limiting sense.

What is claimed is:—

1. In combination, a huge underground tank adapted to store steam at substantially its critical temperature and pressure, a huge tank adapted to store a liquid at high temperature and low pressure, a displacing liquid having low vapor pressure at high temperature contained in said low pressure tank, a pump adapted to pump said displacing liquid from said low pressure tank into said huge underground tank to displace steam at times of peak load and a liquid motor adapted to absorb the energy of said displacing liquid as it is driven from said high pressure underground tank into said low pressure tank during times of light load.

2. A steam power station adapted to carry system peak loads consisting of a steam boiler arranged to operate continuously to generate steam at substantially the critical temperature thereof, pressure and a turbo generator arranged to utilize steam from said boiler at substantially said critical temperature and pressure thereof to generate power to carry peak loads, a displaced liquid, and a huge underground cavern for receiving said displacing liquid and arranged to be emptied of said liquid to receive steam from said boiler at said critical temperature and pressure during light load periods and arranged to be filled with said displacing liquid to displace said steam during peak load periods for use in said turbo generator.

3. A huge underground cavern adapted to store a fluid containing large quantities of heat per unit volume and at high temperature and pressure, a displacing liquid having a low vapor pressure at said high temperature, hydraulic means arranged to pump said displacing liquid into said huge underground cavern to displace said stored fluid during periods when said stored fluid is being used and additional hydraulic means adapted to utilize the energy of said displacing liquid during times when the storing of fluid in said underground cavern forces the displacing liquid out of said huge underground cavern through said additional hydraulic means.

4. In combination, a huge high pressure cavern containing a fluid at high temperature and pressure, a displacing liquid, a huge low pressure cavern containing said displacing liquid at high temperature and low pressure, hydraulic means adapted to pump said displacing liquid from said low pressure cavern into said high pressure cavern to displace said high pressure fluid, and additional hydraulic means adapted to utilize the energy of said displacing liquid as it is driven by said fluid from said high pressure cavern into said low pressure cavern.

5. A huge underground cavern adapted to store at high pressure a fluid containing a large quantity of heat energy per unit volume, turbine means adapted to utilize the heat energy of said stored fluid to carry heavy peak power loads, a displacing liquid and hydraulic means to pump said displacing liquid into said huge underground cavern to displace said fluid for use in said turbine means during the duration of said peak power loads.

6. A huge underground cavern adapted to store at high pressure a fluid containing a large quantity of heat energy per unit volume, turbine means adapted to utilize the heat energy of said stored fluid to carry heavy peak power loads, a displacing liquid and hydraulic means to pump said displacing liquid into said huge underground cavern to displace said fluid for use in said turbine means during the duration of said peak power loads, and additional hydraulic means connected to utilize the energy of said displacing liquid as it is driven out of said huge underground cavern by said fluid during fluid storing periods.

In testimony, that I claim the invention set forth above I have hereunto set my hand this 1st day of March, 1932.

FRAZER W. GAY.